May 12, 1970     L. H. BRIXNER     3,511,786
STRONTIUM TITANATE-FERRATE THERMISTOR COMPOSITIONS
Filed Aug. 22, 1967

INVENTOR
LOTHAR H. BRIXNER

BY    Fred E. Carlson
ATTORNEY

United States Patent Office 3,511,786
Patented May 12, 1970

---

3,511,786
STRONTIUM TITANATE-FERRATE THERMISTOR COMPOSITIONS
Lothar H. Brixner, West Chester, Pa., assignor to E. I. du Pont de Nemours and Company, Wilmington, Del., a corporation of Delaware
Filed Aug. 22, 1967, Ser. No. 662,515
Int. Cl. H01b 1/06
U.S. Cl. 252—521                              4 Claims

---

ABSTRACT OF THE DISCLOSURE

Novel strontium titanate ferrate compositions of the formula $SrTi_{(1-x)}Fe_xO_{(3-0.5x)}\phi_{0.5x}$, in which $x$ has a value of from 0.01 to 0.999 and $\phi$ represents an oxygen deficiency, have a negative temperature coefficient of electrical resistance and are useful as resistance heating bars, particularly at high temperatures.

---

BACKGROUND OF THE INVENTION

Field of the invention

This invention relates to compositions for use as thermistors having a negative temperature coefficient of electrical resistance. For purposes of this invention, the word "thermistor" may be defined as a thermally sensitive electrical resistor. Thermistors find wide-spread applications as highly sensitive thermostats and may be used in many applications for automatic controls. The novel compositions are novel thermistor materials which, over a wide range of temperatures, exhibit negative coefficients of electrical resistance. These materials make possible greater control over the shape of the temperature-resistance curve than has previously been found possible with many known compositions.

The compositions of this invention are new, sintered strontium titanate-base thermistors containing ferric oxide as dopant.

Description of the prior art

The host crystal for the compositions of this invention is strontium titanate of the chemical formula $SrTiO_3$. Undoped $SrTiO_3$ constitutes an undistorted cubic perovskite, with the $Ti^{+4}$ octahedrally surrounded by 6 oxygen atoms. It has been proposed to modify perovskite by substituting tetravalent iron or manganese for $Ti^{+4}$—see Cesare Brisi, Annali di Chimica 45 431–8 (1955). Such tetravalent iron substitution does not, of course, create crystal lattice vacancies such as characterize the products of the present invention in which trivalent ions are substituted.

SUMMARY

Now according to the present invention it has been found that the solubility range of $Fe^{+3}$ in the perovskite structure is extreme, since essentially total substitution is possible with the end member of the series, $SrFeO_{2.5}$, being a strontium ferrate III, which is a defect structure of the established strontium ferrate (IV) $SrFeO_3$. In the case where $Fe_2O_3$ is substituted in the strontium titanate host crystal, electroneutrality after substitutional exchange of $Ti^{+4}$ by $Fe^{+3}$ is achieved by way of anion defects as represented in the formula $SrTi^{+4}_{1-x}Fe_x^{+3}O_{(3-0.5x)}\phi_{0.5x}$ ($\phi$ representing the lattice vacancies). Electrically, the 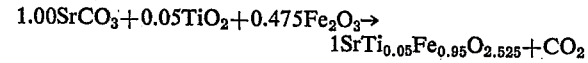 $SrTi_{1-x}Fe_xO_{(3-0.5x)}\phi_{0.5x}$ compositions are p-type semiconductors with very strong negative temperature coefficients of electrical resistivity, the ranges as a function of $x$ being from a few ohm-centimeters to $10^{11}$ Ωcm. Thus, all compositions of this general formula are useful for various thermistor and printed resistor applications, while the ones high in iron are specifically suitable for resistance heating applications. In the formulas which follow, the representation of the vacancies is sometimes omitted for convenience, but it will be understood that anion defects $\phi$, in the crystal lattices are present as called for by the formula: 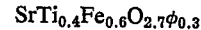 $SrTi_{(1-x)}Fe_xO_{(3-0.5x)}\phi_{0.5x}$.

BRIEF DESCRIPTION OF THE DRAWING

In the drawings.

 $SrTi_{0.4}Fe_{0.6}O_{2.7}\phi_{0.3}$ (dashed line) as compared with solid SiC (solid line), a commercial resistor material.

DESCRIPTION OF THE PREFERRED EMBODIMENTS

To illustrate the preparation of particular compositions of this invention and to show the properties of these compositions, the following examples are given:

EXAMPLE 1

This example will illustrate preparation of the composition $SrTi_{0.05}Fe_{0.95}O_{2.525}$. This composition was prepared by weighing stoichiometric quantities of the reactant materials according to the formulae and equation as follows:

$1.00 SrCO_3 + 0.05 TiO_2 + 0.475 Fe_2O_3 \rightarrow$
$1 SrTi_{0.05}Fe_{0.95}O_{2.525} + CO_2$ To make the product of this equation, 4.000 grams $SrCO_3$, 0.1082 gram $TiO_2$, and 2.0552 grams $Fe_2O_3$, all of the best commercially available purity and generally 99.9%+, were weighed to the nearest 1/10 milligram, and these powders were dry blended and fired in a Pt dish to 900° C. for 10 to 14 hours. The product of this reaction was ball milled under acetone to effect homogenization, and subsequently was compacted into bars 1/4" x 1/4" x 2", at room temperature under 40 t.s.i. These compacts were then fired in air or oxygen at 1200° to 1400° C. for another 10 to 14 hours. After this firing the bars were found to be strong bodies of about 80–90% theoretical density, whose electrical and structural properties were readily measured.

For measurement of electrical properties, the ends of the bars were silvered and leads were attached to the silvered portions. A two-point probe was used to measure the resistivity, and results for the composition of this example were as follows:

at 30° C.: 2.4 x 10 Ωcm.
at −196° C.: 1.6 x 10⁶ Ωcm.
at 850° C.: 2.0 x 10¹ Ωcm.

Figure 1:
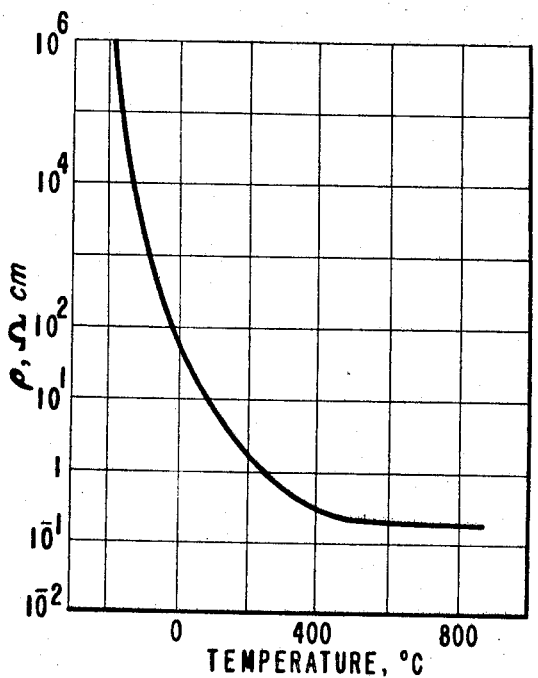
FIG. 1 is a graph of resistivity plotted against temperature for the composition of the invention having the formula $SrTi_{0.05}Fe_{0.95}O_{2.525}\phi_{0.475}$

There is shown in FIG. 1, a graph for resistivity plotted against temperature for the composition of this example.

Crystallographic examination of the composition of this example showed it to be a single-phase composition having a lattice constant of 3.875±0.001 A., and an X-ray density of 5.24 grams per ml.

EXAMPLE 2

Using the procedure of Example 1, a composition of the chemical formula $SrTi_{0.1}Fe_{0.9}O_{2.55}$ was prepared. For this composition the following weights of reactants were used: 4.0000 grams $SrCO_3$; 0.2165 gram $TiO_2$; and 1.9468 grams $Fe_2O_3$. These reactants were fired, ground for homogenization, compacted, and refired as described in Example 1.

The electrical properties of the product of this example are as follows:

at room temperature: $1.2 \times 10^2$ Ωcm.
at $-196°$ C.: $6.9 \times 10^5$ Ωcm.

X-ray analysis of this product showed it to be a single-phase composition with a density of 5.2 grams per ml.$^{-1}$ and a cell edge of $3.879 \pm 0.001$ A.

A composition of this example was operated as a resistance heating bar up to a temperature of 1200° C. in air. The power measurements for this heating bar are recorded in Table I.

TABLE I
[Power measurements for bar of composition $SrTi_{0.1}Fe_{0.9}O_{2.55}$]

| T., °C. (approx.) uncorrected pyrometer reading | Amp. | Volts | Watts | Resistance, Ω | Specific resistivity, Ωcm. |
|---|---|---|---|---|---|
| 600 | 4.8 | 10.5 | 50.4 | 2.2 | 0.18 |
| 800 | 5.5 | 12.0 | 66.0 | 2.2 | 0.18 |
| 1,050 | 6.0 | 16.0 | 96.0 | 2.6 | 0.22 |
| 1,100 | 6.5 | 20.5 | 133.2 | 3.1 | 0.26 |
| 1,200 | 7.0 | 22.0 | 154.0 | 3.1 | 0.26 |

EXAMPLE 3

Figure 2:
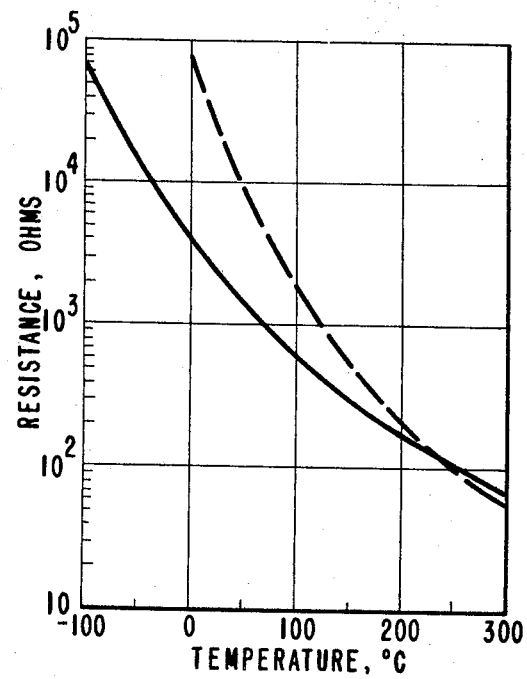
FIG. 2 is a graph of resistance plotted against temperature for the composition of the invention.

Using the procedure of Example 1, a composition of the formula $SrTi_{0.40}Fe_{0.60}O_{0.70}$ was prepared. The amounts of reactants used for the preparation of this composition were as follows: 6.1594 grams $SrCO_3$, 2.0000 grams $TiO_2$, and 1.3324 grams $Fe_2O_3$. As in Example 1, the bars of this composition were prepared by the steps of blending, heating, grinding, compacting and refiring. There is shown in FIG. 2 a graph for resistance plotted against temperature for the composition of this example as compared with solid SiC, a commercial thermistor material. It will be seen from this graph that the composition of this invention shows an even stronger temperature dependence than does the commercially available and widely used SiC material of the prior art.

In the manner of the above examples, other compositions were prepared in which substitutions of $Fe_2O_3$ were made in the strontium titanate crystal in which $x$ in the formula $SrTi_{(1-x)}Fe_xO_{(3-0.5x)}\phi_{0.5x}$ had a value from 0.01 to 0.05. The structural data for these compositions, including the compositions of Examples 1, 2, and 3 were as follows:

TABLE II
[X-ray crystallographic data for compositions $SrTi_{(1-x)}Fe_xO_{(3-0.5x)}\phi_{0.5x}$, where x=0.01 to 0.95]

| Ex. No. | Composition | Value of x | $a_0$ (A±0·001) | Mol. vol. A³ | X-ray density (calc.) |
|---|---|---|---|---|---|
| 1 | $SrTi_{0.05}Fe_{0.95}O_{2.525}$ | 0.95 | 3.875 | 58.18 | 5.24 |
| 2 | $SrTi_{0.10}Fe_{0.90}O_{2.55}$ | 0.90 | 3.879 | 58.36 | 5.22 |
| 3 | $SrTi_{0.40}Fe_{0.60}O_{2.70}$ | 0.60 | 3.892 | 58.95 | 5.17 |
| 4 | $SrTi_{0.99}Fe_{0.01}O_{2.995}$ | 0.01 | 3.905 | 60.92 | 5.11 |
| 5 | $SrTi_{0.80}Fe_{0.20}O_{2.90}$ | 0.20 | 3.903 | 59.46 | 5.12 |
| 6 | $SrTi_{0.70}Fe_{0.30}O_{2.85}$ | 0.30 | 3.901 | 59.36 | 5.13 |
| 7 | $SrTi_{0.50}Fe_{0.50}O_{2.75}$ | 0.50 | 3.896 | 59.14 | 5.15 |
| 8 | $SrTi_{0.30}Fe_{0.70}O_{2.65}$ | 0.70 | 3.888 | 58.77 | 5.18 |

Figure 3:
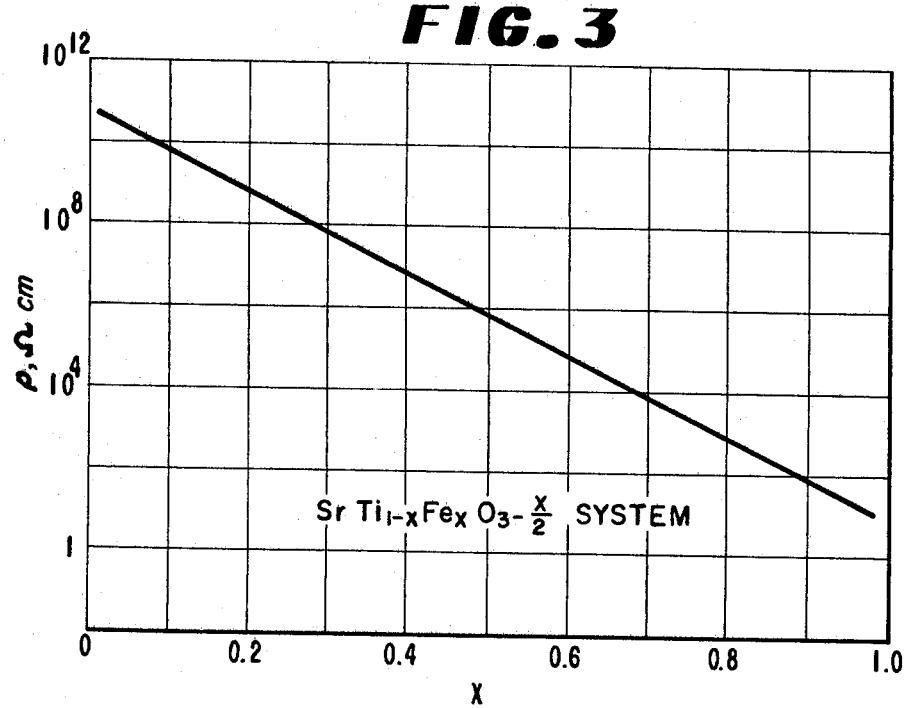
FIG. 3 is a graph of resistivity plotted against composition for the system of the invention $SrTi_{(1-x)}Fe_xO_{(3-0.5x)}\phi_{0.5x}$

There is shown in FIG. 3 a plot of resistivity in ohms versus increasing values for $x$ as in the above compositions.

From the results which are given above it is seen that there have been prepared compositions of the general formula $SrTi_{(1-x)}Fe_xO_{(3-0.5x)}$ which are useful as negative temperature thermistors, and for use, particularly at high temperatures, as resistance heating bars. These compositions will be found particularly useful as ingredients in ceramic compositions for resistance heating elements, as for example, ceramic hot plates.

I claim:
1. A strontium titanate ferrate composition having the formula $SrTi_{(1-x)}Fe_xO_{(3-0.5x)}\phi_{0.5x}$ in which $x$ has a value of from 0.01 to 0.999 and $\phi$ represents an oxygen deficiency, said composition being characterized by having a negative temperature coefficient of resistance.

2. A composition of claim 1 having the formula:

$$SrTi_{0.05}Fe_{0.95}O_{2.525}\phi_{0.475}$$

3. A composition of claim 1 having the formula:

$$SrTi_{0.1}Fe_{0.9}O_{2.55}\phi_{0.45}$$

4. A composition of claim 1 having the formula:

$$SrTi_{0.4}Fe_{0.6}O_{2.7}\phi_{0.3}$$

References Cited
UNITED STATES PATENTS

| 3,105,800 | 10/1963 | Watenabe | 252—520 |
| 3,420,776 | 1/1969 | Hepplewhite et al. | 252—520 |
| 3,441,517 | 4/1969 | Brauer et al. | 252—520 |

DOUGLAS J. DRUMMOND, Primary Examiner

U.S. Cl. X.R.

23—51; 252—520, 519; 338—25